US010399754B2

(12) United States Patent
Prevot et al.

(10) Patent No.: US 10,399,754 B2
(45) Date of Patent: Sep. 3, 2019

(54) CLAMPING COLLAR WITH A TRANSVERSE BUCKLE

(71) Applicant: ETABLISSEMENTS CAILLAU, Issy-les-Moulineaux (FR)

(72) Inventors: Fabrice Prevot, Selles-sur-Cher (FR); Nicolas Rigollet, Romorantin (FR); Julien Beauvais, Romorantin (FR); Quentin Esperet, Romorantin (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 0 days.

(21) Appl. No.: 15/321,096

(22) PCT Filed: Jun. 22, 2015

(86) PCT No.: PCT/FR2015/051646

§ 371 (c)(1),
(2) Date: Dec. 21, 2016

(87) PCT Pub. No.: WO2015/197961

PCT Pub. Date: Dec. 30, 2015

(65) Prior Publication Data

US 2017/0362004 A1 Dec. 21, 2017

(30) Foreign Application Priority Data

Jun. 23, 2014 (FR) ..................................... 14 55795

(51) Int. Cl.
*B65D 63/00* (2006.01)
*B65B 13/30* (2006.01)
(Continued)

(52) U.S. Cl.
CPC ............ *B65D 63/08* (2013.01); *B65B 13/305* (2013.01); *F16B 2/08* (2013.01); *Y10T 24/1465* (2015.01)

(58) Field of Classification Search
CPC . B65D 63/08; Y10T 24/1465; Y10T 24/1457; Y10T 24/1459
See application file for complete search history.

(56) References Cited

U.S. PATENT DOCUMENTS

| | | | | |
|---|---|---|---|---|
| 193,946 A | 8/1877 | Hamilton et al. | | |
| 1,218,337 A * | 3/1917 | Taylor | .................... | B65D 63/08 217/93 |

(Continued)

FOREIGN PATENT DOCUMENTS

| | | |
|---|---|---|
| CN | 1919697 A | 2/2007 |
| DE | 201 04 180 | 6/2001 |

(Continued)

OTHER PUBLICATIONS

International Search Report dated Oct. 14, 2015 for corresponding international patent application No. PCT/FR2015/051646.

*Primary Examiner* — Robert Sandy
*Assistant Examiner* — Michael S Lee
(74) *Attorney, Agent, or Firm* — Fay Sharpe LLP; James E. Scarbrough

(57) ABSTRACT

The collar has a looped metal strap (10) and a transverse buckle (12) retained at the first end of the strap and forming, on the outer side of the first end, a passage (13) through which the second end (10B) of the strap can be inserted over the first end, the second end of the strap as inserted in this way being suitable for being indented so as to co-operate with at least one of the elements including the transverse buckle (12) and the first end (10A) of the strap, in order to be retained so that it is prevented from moving in the direction in which the diameter of the collar increases. The buckle (12) carries at least one radially projecting outer tab (20, 22), the tab having the shape of a hook having a stem carrying a head under which a recess is formed.

18 Claims, 5 Drawing Sheets

(51) Int. Cl.
*B65D 63/08* (2006.01)
*F16B 2/08* (2006.01)

(56) References Cited

U.S. PATENT DOCUMENTS

| | | | | | |
|---|---|---|---|---|---|
| 1,226,876 | A * | 5/1917 | Furth | B65D 63/08 238/29 |
| 1,241,301 | A * | 9/1917 | Taylor | B65D 63/08 24/23 B |
| 4,765,032 | A * | 8/1988 | Fortsch | B65D 63/06 24/23 R |
| 4,803,758 | A * | 2/1989 | Calmettes | F16L 33/08 24/20 EE |
| 4,868,953 | A * | 9/1989 | Fortsch | B65D 63/06 24/23 R |
| 5,007,138 | A * | 4/1991 | Pritchard | F16L 3/233 24/200 |
| 7,373,695 | B2 | 5/2008 | Caveney et al. | |
| 2007/0033772 | A1 | 2/2007 | Brownlee et al. | |

FOREIGN PATENT DOCUMENTS

| | | |
|---|---|---|
| EP | 0 187 693 | 7/1986 |
| EP | 1 340 689 | 9/2003 |
| EP | 1 775 220 | 4/2007 |
| GB | 2 168 103 | 6/1986 |
| GB | 2 254 105 | 9/1992 |

* cited by examiner

CLAMPING COLLAR WITH A TRANSVERSE BUCKLE

The present invention relates to a clamping collar comprising a looped metal strap and a transverse buckle retained at the first end of the strap and forming, on the outer side of said first end, a passage through which the second end of the strap can be inserted over the first end, the second end of the strap as inserted in this way being suitable for being indented so as to co-operate with at least one of the elements comprising the transverse buckle and the first end of the strap, in order to be retained so that it is prevented from moving in the direction in which the diameter of the collar increases.

A collar of that type is known, for example, from Patents EP 1 775 220, U.S. Pat. Nos. 5,566,726, and 7,373,695. To tighten the collar around an article, after the strap has been looped back around the article, and after the second end of the strap has been inserted through the passage in the buckle, it is necessary to exert traction on the second end in order to reduce the diameter of the collar, and then to indent the second end so as to retain it against the buckle and/or against the first end. In general, during the indenting, or just afterwards, the second end is cut off in the vicinity of the buckle.

It needs to be possible for those operations to be performed in situ, in the environment of the articles that are to be clamped by the collar, and using a tool that is compact and easy to operate. For the tightening to be of good quality, it is important for the collar to be positioned properly relative to the tool, and, in particular, for the second end of the strap to be positioned properly for being indented.

Above-mentioned Patents EP 1 775 220 and U.S. Pat. No. 5,566,726 use tools that are positioned imprecisely relative to the strap of the collar. U.S. Pat. No. 7,373,695 proposes a tool, presented very diagrammatically, and that has flanks with lower projections forming soleplates on which the edges of the buckle rest. This requires the buckle to be shaped very specifically, because it must have laterally projecting edges that can rest on the soleplates. In addition the flanks of the tool occupy a large amount of space laterally, so that there are many situations in which the environment of the article(s) to be clamped is too cluttered for it to be possible to use the tool.

The invention proposes to remedy those drawbacks of the state of the art at least in part, by proposing a collar that can be easily positioned with precision relative to the tightening tool.

This object is achieved by means of the fact that the buckle carries at least one radially projecting outer tab, the tab having the shape of a hook having a stem carrying a head under which a recess is formed.

The outer tab may be made in a simple and laterally compact manner. Taking advantage of the recess that is formed under the heat of the tab, it is possible to insert a positioning member that may, in particular, be a portion of the tool for tightening the collar, in such a manner that the tool comes to co-operate with the outer tab(s) to position the collar with a view to it being tightened. In this co-operation, the stem of the hook facilitates proper lateral positioning (i.e. positioning in the direction transverse to the strap) of the collar, while the head facilitates good tangential positioning (i.e. positioning in a direction parallel to a tangent to the strap passing through the buckle).

In accordance with an option, the head of the hook has a free edge that extends substantially along the length of the strap.

The hook is thus of shape that is particularly simple to achieve.

In accordance with an option, the passage includes a restraint segment defined by at least one outer wall portion of the buckle situated above the outer face of the first end of the strap, and the outer tab is offset longitudinally relative to said outer wall portion.

The outer wall portion thus fully plays its part as a restraint wall. If, while the collar is being tightened, the tab is deformed or damaged, that does not in any away affect the quality of the restraint achieved by the outer wall portion.

The outer tab may be separated from the outer wall portion by a cutout. The tab is then particularly simple to manufacture. In particular, the outer tab and the above-mentioned wall portion may be obtained from the same base wall, cut out transversely in such a manner as to form a first portion that, after being folded appropriately, forms the wall portion, and a second portion that, after being folded differently, forms the outer tab.

In accordance with an option, the outer tab is situated in the vicinity of a transverse edge of the buckle that is further away from the free tip of the second end of the strap.

Thus, the outer tab does not form an obstacle or a hindrance while the second end of the strap is being cut off, it being possible for this cutting-off to be performed very cleanly, in the immediate vicinity of the transverse edge of the buckle that is further away from the tab. Similarly, the indenting for retaining the second end of the strap so as to keep the collar tight can be performed with precision, in the vicinity of the middle of the buckle or in the vicinity of its transverse edge that is further away from the tab, without said tab forming an obstacle or a hindrance.

In accordance with an option, the buckle has two analogous radially projecting outer tabs that extend from respective ones of the two longitudinal sides of the buckle, it being possible for the second end of the strap to be inserted between the stems of said tabs.

This further facilitates blocking the collar laterally relative to the tightening tool.

In accordance with an option, the collar has means for allowing the second end of the strap to be inserted between the stems of the tabs only in the vicinity of the junction between said stems and the longitudinal sides of the buckle.

These means constitute indexing-type means that, while the collar is being closed around an article to be clamped, avoid the collar appearing to be correctly closed whereas in reality the second end of the strap is engaged between the tabs only, without being engaged through the portion of the buckle (e.g. the above-mentioned wall portion defining the restraint segment) that actually serves for achieving the tightening.

In accordance with an option, at least one of the tabs, and preferably each of the two tabs, has an inner rib at the junction between its stem and its head.

This rib offers two advantages. Firstly, it stiffens the outer tab at the junction between its stem and its head, and thus facilitates keeping the collar in the proper position while it is being tightened, even though indenting the second end of the strap can involve quite large forces. In addition, if its size is appropriate, the rib can act to provide the above-mentioned indexing function.

In accordance with an option, the buckle has an inner portion that is disposed against the inner face of the first end of the strap and that has a blocking transverse edge that faces in the opposite direction from the direction in which the free tip of the first end of the strap faces, and that co-operates with a blocking transverse stop of the first end of the strap that defines a blocking setback formed in said first end, and, in the indented state so that it is retained so as to be prevented from moving in the direction in which the diameter of the collar increases, the second end of the strap has a retaining transverse stop received in the blocking setback and co-operating in abutment with a retaining edge of said blocking setback.

In this situation, the first end of the strap is blocked relative to the buckle by the co-operation between the blocking edge and the blocking stop. The indenting of the second end of the strap forms the retaining stop, and said retaining stop co-operates not with the buckle but rather with the retaining edge of the blocking setback, which is itself formed in the first end of the strap. In other words, the collar is tightened by its first end co-operating directly with its second end. In the tightened situation, the buckle is thus no longer subjected to large forces, those forces being exerted directly between the two ends of the strap. This limits the risks of the tightening being degraded over the life of the collar.

The invention can be well understood and its advantages appear more clearly on reading the following detailed description of an embodiment that is shown by way of non-limiting example. The description refers to the accompanying drawings, in which.

In the present text, the term "inner" is used to describe an element that is situated closer to the geometrical center C of the circle defined by the collar, while the term "outer" is used to describe an element that is situated further away from said center C. In addition, the term "longitudinal" is used to describe an element that extends along the length of the strap, i.e. when the strap is looped back on itself as shown in the figures, an element that extends in the looping direction. The term "transverse" is used to describe an element extending perpendicularly to said length, i.e. across the width of the strap.

Figure 1:
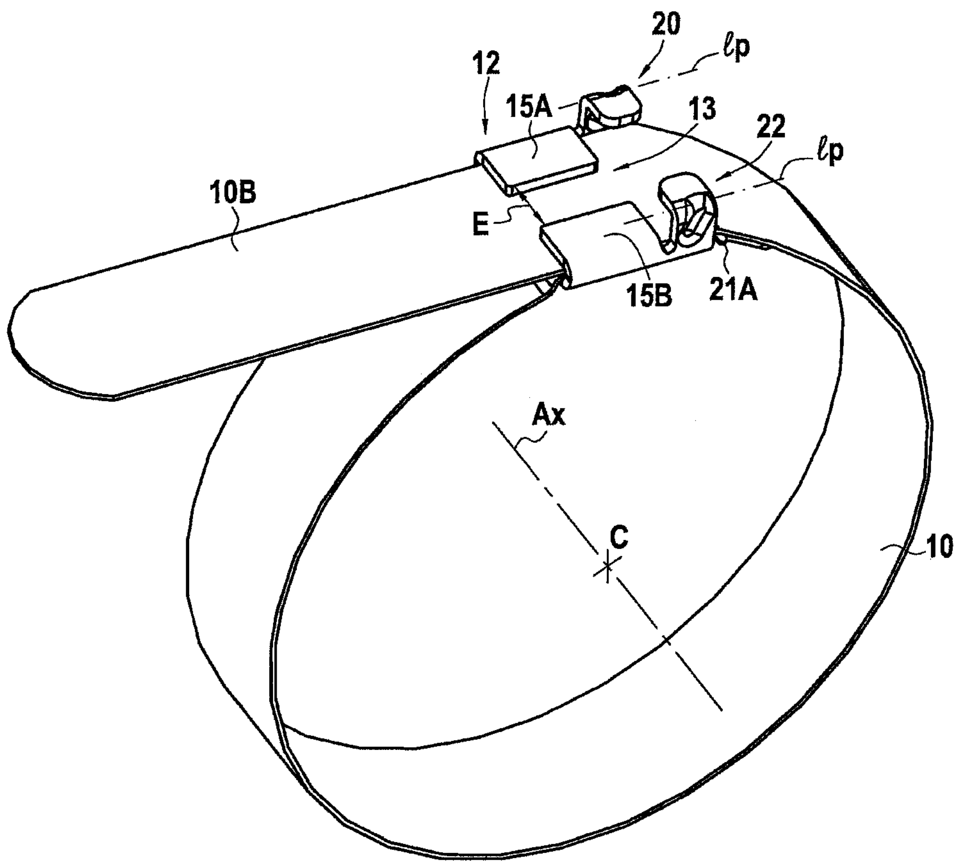
FIG. 1 is a perspective view of a clamping collar of the invention, before it is tightened.
Figure 2:
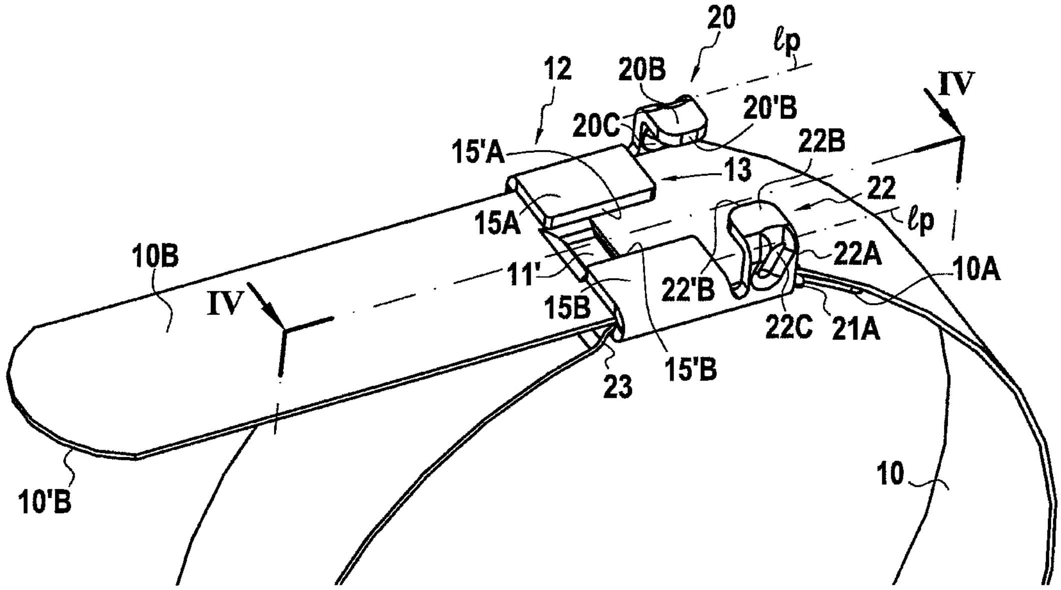
FIG. 2 is a fragmentary perspective view of the same collar, after it is has been tightened.
Figure 3:
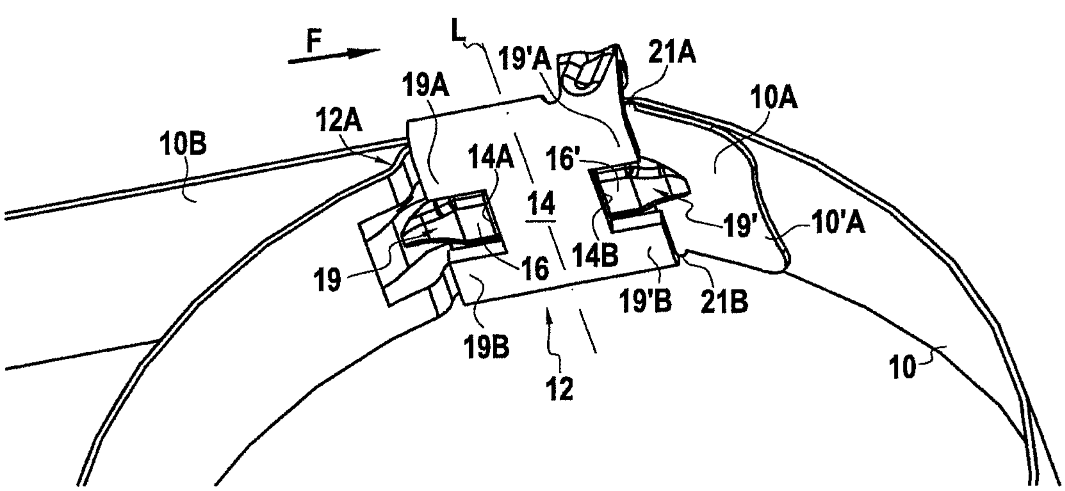
FIG. 3 is a perspective view showing the inner face of the strap of the collar of FIGS. 1 and 2, in the vicinity of the transverse buckle.

Firstly, a description is given of FIGS. 1 and 3, in which a clamping collar can be seen that comprises a looped metal strap 10 and a transverse buckle 12 retained at the first end 10A of the strap. As can be seen more clearly in FIGS. 1 and 2, on the outer side of the first end 10A, the buckle 12 forms a passage 13 through which the second end 10B is inserted.

In the meaning of the present specification, the "first end" of the strap is the entire segment of the first end that co-operates with the buckle. In the same way, the "second end" is the entire segment of the second end that co-operates with the buckle.

As can be seen more clearly in FIG. 3, the buckle 12 has an inner portion 14 disposed against the inner face of the first end 10A of the strap 10. On the outer side, the buckle has two outer wall portions, respectively 15A and 15B, each of which is folded over from a respective one of the longitudinal edges of the inner portion 14. These outer wall portions form tongues that are situated above the outer face of the first end 10A of the strap 10. The space defined radially between the inner faces of these folded-over tongues and the outer face of the end 10A of the strap forms a restraint segment of the passage 13, through which segment the second end 10B of the strap is caused to pass. The concept of "restraint segment" is used to mean that the radial height of said space is just sufficient to enable the second end 10B of the strap to be inserted through it, said second end thus being retained to prevent it from moving radially outwards.

Figure 4:
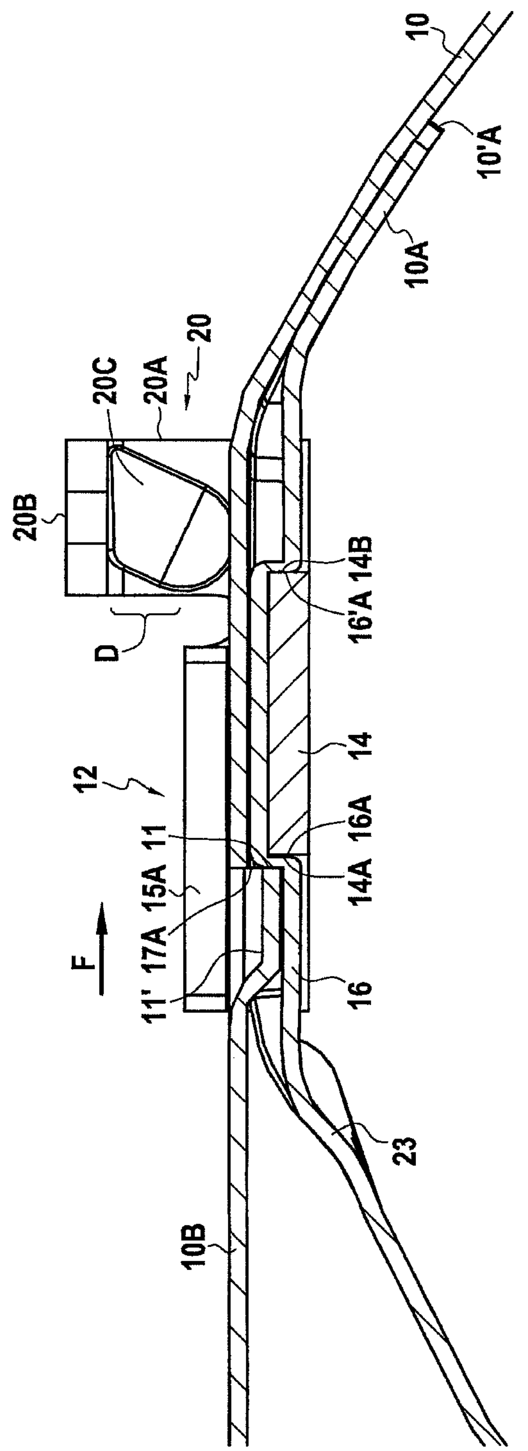
FIG. 4 is a section view on the section plane IV-IV of FIG. 2.

It can be seen, in particular in FIGS. 3 and 4, that the first end 10A has a blocking setback 16 that contributes to blocking the buckle relative to the first end. As can be seen better in FIG. 4, this blocking setback 16 has a blocking transverse stop 16A that co-operates with a blocking transverse edge 14A of the inner portion of the buckle 12. In the example shown, this edge and this stop are rectilinear and extend transversely to the strap. Thus, the co-operation between the stop 16A and the edge 14A prevents the first end 10A of the strap from moving in the direction F (see FIG. 4) relative to the buckle 12.

For retaining it in the other direction, means analogous to the means described above are used. For this purpose, in the example shown, the inner portion 14 of the buckle 12 has an additional blocking transverse edge 14B that faces towards the free tip 10'A of the first end 10A of the strap and that co-operates with an additional blocking transverse stop 16'A in the first end of the strap. This additional blocking transverse stop defines an additional blocking setback 16' formed in said first end.

The additional blocking transverse stop 16B and the additional blocking setback 16' are generally symmetrical to the blocking transverse stop 16A and to the blocking setback 16 about a transverse midline L of the inner portion of the buckle. The co-operation between the stop 16'A and the edge 14B prevents the first end 10A of the strap from moving relative to the buckle 12 in the direction opposite to the direction F indicated in FIG. 4.

When the collar is in the tightened state, the second end of the strap, which is inserted through the passage 13, is indented so as to co-operate with at least one of the elements comprising the transverse buckle 12 and the first end 10A of the strap 10, in order to be retained so that it is prevented from moving in the direction in which the diameter of the collar increases.

FIG. 1 shows the situation in which the second end 10B is inserted through the passage 13 and before it is indented, while FIGS. 2 and 4 show situation after the indenting has been performed.

In this example, as can be seen more clearly in FIG. 4, the second end 10B of the strap has a retaining transverse stop 11 that is received in the blocking setback 16. This retaining transverse stop co-operates in abutment with a retaining edge 17A of the blocking setback 16. It can be understood that the co-operation between the retaining stop 11 and the retaining edge 17A prevents the second end 10B of the strap from moving relative to the first end 10A in the direction indicated by the arrow F in FIG. 4. In other words, once the collar has been tightened, this co-operation prevents the collar from coming loose.

The indenting of the second end 10B of the strap forms a retaining setback 11' that forms a projection on the inner face of the second end 10B of the strap. The retaining transverse stop 11 defines this retaining setback 11'. As can be seen in FIG. 4, the retaining setback is received in the blocking setback 16.

The retaining setback 11' is defined by a transverse cutout, the retaining stop 11 being formed on the lip of said cutout that is situated at the back of the retaining setback 11', and that faces in the opposite direction to the direction in which the free tip 10'B of the second end of the strap faces.

In this example, the blocking setback 16 forms a dish having one of its sides forming the blocking stop 16A on its face outside the setback 16, and forming the retaining edge 17A on its face inside the setback. Departing from the above-defined concepts of "inner" and "outer", the setback inside and outside faces are defined relative to the setback itself.

As can be seen more clearly in FIG. 3, the blocking transverse edge 14A is a free edge, situated on the first free end 12A of the inner portion 14 of the buckle 12. More precisely, in this example, the blocking transverse edge 14A is formed at the back of a notch 19 in the above-mentioned first free end 12A. The blocking setback 16 is received in the notch while being flanked on either side by protruding branches 19A and 19B on either side of the slot.

As can be seen in FIG. 3, the inner face of the setback 16 goes, in the vicinity of the back of the notch, from the radial level of the inner face of the inner portion 14 of the buckle, and returns gradually to the plane of the strap as it goes away from the back of the notch 19 so as not to form an abrupt shoulder in the inner face of the strap.

Conversely, it can be observed that the first end of the strap that is situated at the free end 12A of the inner portion of the buckle 12 forms an inwardly extending shoulder 23 so that the inner face of the strap that is situated on the side of said shoulder that is further away from the free tip 10'A of the strap is situated substantially in alignment with the inner face of the buckle 12. The height of the shoulder, as measured radially, corresponds substantially to the thickness Eb of the inner portion 14 of the buckle.

Like the blocking transverse edge 14A, the additional blocking transverse edge 14B is a free edge of the buckle, but it is situated at the second free end 12B of the inner portion 14 of the buckle that is opposite from its first free end 12A. This additional blocking edge 14B is also formed at the back of a notch 19' in the second free end 12B of the inner portion 14 of the buckle, which notch is flanked by longitudinal protruding branches 19'A and 19'B.

It can also be observed that, at the second free end 12B of the inner portion 14 of the buckle, the first end 10A of the strap has side projections 21A, 21B. These projections are formed by partial punching of the first end of the strap, which punching causes material to be driven transversely outwards. They form side "lugs" with which the free end 12'B of the buckle co-operates, and they thus contribute to retaining the first end of the strap to prevent it from moving in the direction opposite to the direction indicated by arrow F relative to the buckle 12. Thus, in the example shown, in order to retain the first end of the strap relative to the buckle in the direction opposite to the direction of arrow F, not only the above-mentioned side projections 21A and 21B are used, but also the additional blocking transverse stop 16'A co-operating with the additional blocking transverse edge 14B.

This makes it possible to obtain very high resistance to the forces exerted while the collar is being tightened. During tightening, in order to exert traction on the second end of the strap in such a manner as to obtain the minimum clamping diameter, the tightening tool may press against the buckle 12 and it is therefore important for the buckle to be securely retained relative to the strap.

Naturally, it is possible to provide the retaining in the direction opposite from the direction F by means of the side projections 21A and 21B only, or else by means of the co-operation between the transverse stop 16'A and the transverse edge 14B only. It is also possible to choose some other mode of retaining available to the person skilled in the art.

In addition, an advantageous example is described and shown for the indenting of the second end of the strap that serves to keep it tight. In this example, precision retaining is achieved and provision is made to ensure that the traction forces to which the strap is subjected when the collar is in the tightened state are exerted "strap-on-strap", without involving the buckle 12. However, the invention also applies to other possibilities of retaining the second end of the strap. For example, the indenting of the second end 10B of the strap may be performed as in Patent EP 1 775 220 (by using an aperture in the inner portion of the buckle), as in U.S. Pat. No. 7,373,695, or indeed as in French Patent 2 542 388.

In accordance with the invention, the buckle 12 is provided with at least one radially projecting outer tab that is hook-shaped, with a head under which a recess is formed.

In this example, the buckle 12 has two outer tabs 20 and 22 of this type that project radially. Each of the tabs is in the form of a hook with a stem, respectively 20A and 22A, and a head, respectively 20B and 22B, so that a recess D is formed under the heads 20B and 22B (see FIG. 4). This recess forms a segment of the passage 13, the second end 10B of the strap passing under the heads 20B and 22B of the hooks. However, as indicated above, it is the restraint segment of this passage, in the form of the folded-over tongues 15A and 15B that serves to retain the end 10B of the strap to prevent it from moving radially outwards.

In this example, the heads have free edges 20'B, 22'B that extend longitudinally. The stems extend facing each other, on either side of the buckle, starting from the longitudinal edges of its inner portion 14, the second end 10B of the strap passing between them for accessing the restraint segment of the passage 13.

The outer tabs 20 and 22 are offset longitudinally relative to the above-mentioned outer wall portions 15A and 15B. The outer wall portion 15A or 15B and the corresponding outer tab 20A or 20B extend from a longitudinal edge of the buckle 12 and have the same length as measured from that edge, in the transverse direction, the outer tab having a longitudinal fold line £p that separates the stem 20A (respectively 22A) and the head 20B (respectively 22B) of the hook. Naturally, the length of the tab 20A or 20B is measured along said tab in the transverse direction of the strap along a broken line that starts from where the tab is attached to the strap and that goes to the free edge 20'A (respectively 20'B) of the tab.

The outer wall portion 15A (respectively 15B) has a free longitudinal edge 15'A (respectively 15'B) situated on the outer side of the first end 10A of the strap.

For example, each tongue of the buckle 12 in which an outer wall portion 15A or 15B is formed may initially be integral with the tab 20 or 22; a single transverse cutout separates the tab from the wall portion, and said wall portion is folded over until it is parallel with the inner portion 14 of the buckle 12, while the tab is shaped into a hook shape.

At least in its outer portion, the buckle 12 is symmetrical about a midplane IV-IV of the strap 10 that is perpendicular to the axis Ax of the collar. In this example, even the inner portion 14 of the buckle is symmetrical about the midplane IV-IV.

Figure 5:
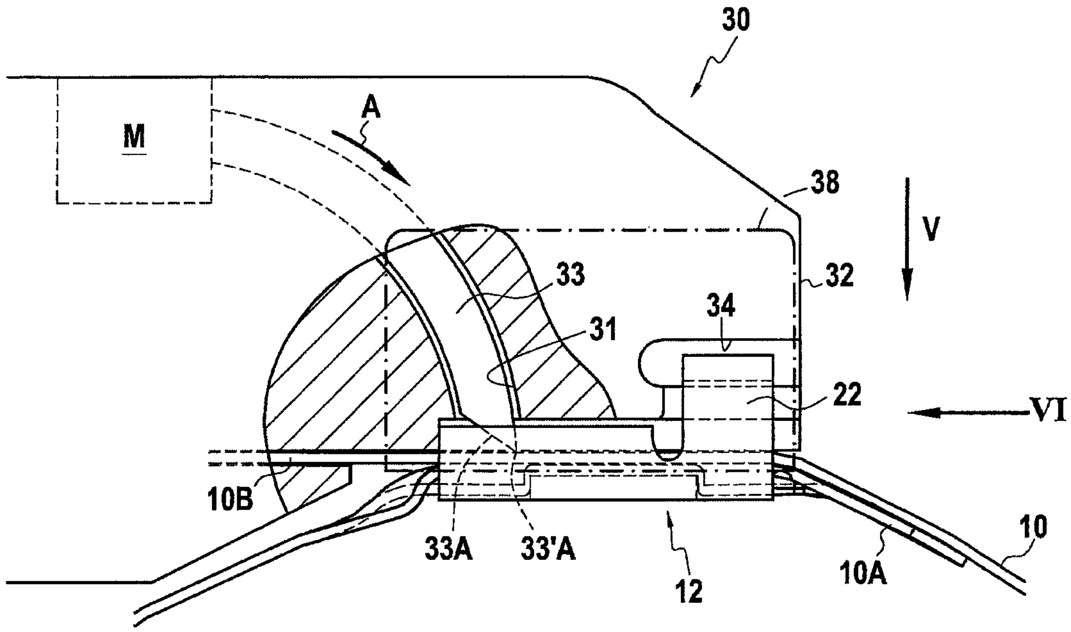
FIG. 5 is a diagrammatic side view showing how the collar of the preceding figures co-operates with its tightening tool.
Figure 6:
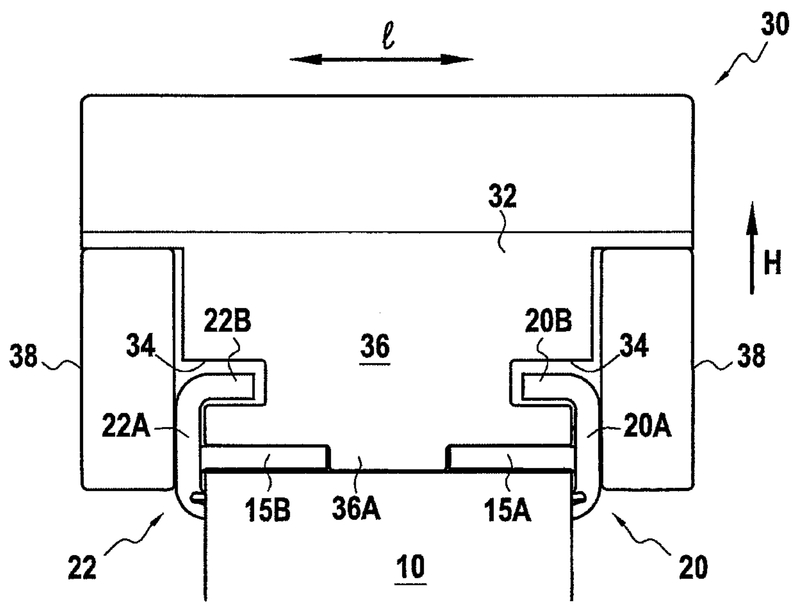
FIG. 6 is an end-on view seen looking along arrow VI of FIG. 5.

The tabs 20 and 22 serve to ensure that the collar and the tool that serves to tighten it are positioned properly relative to each other, as can be understood more clearly with reference to FIGS. 5 and 6, which show how the collar co-operates with the tool that serves to tighten it.

For reasons of simplification, only the active portion of the head of the tool is shown. For more details, reference may be made, for example, to French Patent FR 2 542 388.

The tool includes a head 32 suitable for being positioned on the transverse buckle 12 of the collar, and a punch 33 suitable for being moved to indent the second end 10B of the strap 10. The head 32 is provided with at least one housing 34 for receiving at least a portion of said at least one outer tab 20, 22 carried by the buckle 12 of the collar, in order to position the tool relative to the collar. The housing may comprise a hook-shaped slot.

The portion of the tool 30 that is shown in FIGS. 5 and 6 comprises its head 32 and its punch 33 that, by an actuation system M, is moved inside a channel 31 to come to indent the second end 10B of the strap of the collar, and to form the retaining stop. In FIG. 5, the punch 33 is shown at the time at which it touches the strap of the collar, during its indenting movement in the direction indicated by the arrow A.

The collar is tightened by traction being exerted (by means not shown) on said second end, while the head of the tool is bearing against the buckle 12. Once the desired level of tightening is obtained, the punch 33 is moved to perform the indenting. It should be noted that the head 33A of the punch 33 is beveled and has a transverse cutting spike 33'A. It simultaneously forms the retaining stop 11 and the retaining setback 11'.

As indicated above, the tabs 20 and 22 serve to position the tool and the collar relative to each other. They also make it possible to position the buckle in a plane that is perpendicular to the direction V in which the punch moves to perform the indenting.

More precisely, the tabs 20 and 22 are at least partially inserted into housings formed by side setbacks 34. More precisely, it is the heads 20B and 22B of the hooks formed by said tabs that penetrate into said setbacks 34. The inner face of the head of the hook can thus co-operate with the face of the setback 34 that is situated facing it, so as to prevent the tool from moving relative to the collar in the direction indicated by the arrow H in FIG. 6.

In addition, insofar as two tabs 20 and 22 are present while being situated on respective ones of the longitudinal edges of the buckle 12, i.e. on either side of the longitudinal edges of the collar, a central portion 36 of the head of the tool that is situated on the inner side (towards the center of the collar) relative to the setbacks 34 is blocked between the stems 20A and 22A of the hooks formed by the tabs 20 and 22. This thus makes it possible to prevent the tool from moving laterally relative to the collar in the direction l. It should be noted that the head of the tool may have cheek plates 38 that close the setbacks 34 on the sides of said head, so that the housings for receiving the tabs are in the form of hook-shaped slots. These cheek plates 38 can be seen in FIG. 6 and one of them is sketched in dot-dash lines in FIG. 5.

In the above-described collar, the buckle 12 is formed from a metal blank that is cut out and folded in suitable manner. In this example, the “join plane” of this blank as shaped into the buckle is situated on the outer side of the collar, between the folded-over tongues 15A and 15B. In this example, the longitudinal ends (free longitudinal edges) 15'A, 15'B of said tongues are spaced apart by a width E. Firstly, this makes it possible to save material for the material of which the buckle is formed. Secondly, as can be seen in FIG. 6, this makes it possible to facilitate blocking the tool relative to the collar. The central portion 36 of the head 32 of the tool can thus have an inwardly projecting central rib 36A that is received in the space formed between the free ends of the tongues 15A and 15B, so that it can co-operate directly with the second end 10B of the strap of the collar. Conversely, the side projections that extend on either side of the central rib 36A, on the inner side of the setbacks 34, co-operate directly with the folded-over tongues 15A and 15B.

Considering the tabs 20 and 22 again, it can be seen that each of them has an inner rib, respectively 20C and 22C, at the junction between its stem and its head. The thickness of the inner ribs increases on going towards the head. For example, this can be achieved by gussets that are inclined substantially at 45 degrees relative to the radial direction, and that project towards the inside of the tabs. Thus, the ribs define between them, in the vicinity of the heads of the hooks, a width less than the width of the second end 10B of the strap. This makes it possible to avoid the operative thinking the collar has been closed merely by inserting the second end between the tabs 20 and 22. If the operative is attempts to do so, the shape of the above-mentioned inner ribs acts naturally to drive the second end inwards (towards the center C of the collar), i.e. under the folded-over tongues 15A and 15B, into the restraint segment of the passage 13. In other words, the ribs 20C, 22C form means for allowing the second end 10B of the strap to be inserted between the stems 20A, 22A of the tabs only in the vicinity of the junction between said stems and the longitudinal sides of the buckle 12.

Figure 7:
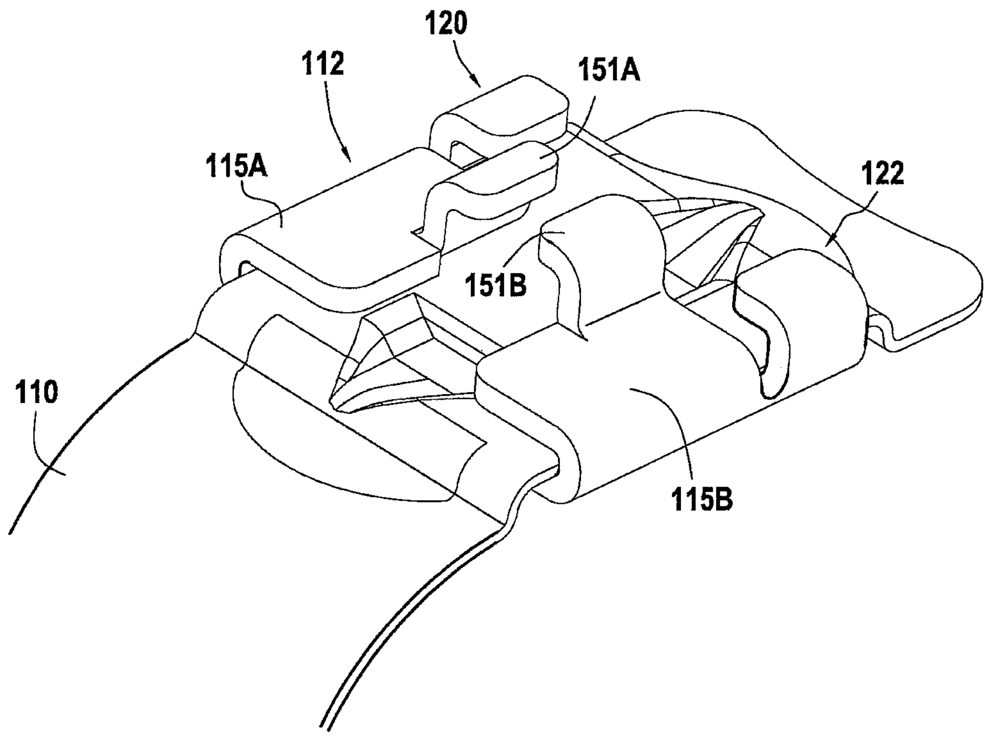
FIG. 7 is a fragmentary perspective view showing the first end of the strap of a collar carrying a transverse buckle, in a variant.

In FIG. 7, the same references as in the preceding figures, plus 100, are used for designating the corresponding elements.

In the variant shown in this figure, the free longitudinal edge of the at least one outer wall portion carries a hook.

More precisely, it can be seen in this figure that the first end of the strap 110 carries a transverse buckle 112 that is substantially analogous to the buckle 12 in the preceding figures, except that the free longitudinal edges of the outer wall portions 115A and 115B carry hooks 151A and 151B that are upstanding so that they extend radially outwards. These hooks serve for demounting the buckle from the strap of the collar. A demounting tool such as pliers of the “circlip” type can be inserted into the space that is provided under their heads and be operated so that, by coming to bear under the hooks, the tool can move the outer wall portions 115A and 115B away so as to loosen the buckle relative to the strap.

In order to make the drawing clearer, FIG. 7 shows the collar in the open state, while the second end of the strap is not inserted through the passage formed, on the outer side of the first end, by the buckle 112. When the second end is engaged through said passage, it is situated under the outer tabs 120 and 122 and under the wall portions 115A, 115B, and thus also under the hooks 151A and 151B.

In general, it is when the collar is closed and tightened that it can become necessary to demount it by demounting the buckle. A tool, e.g. of the pliers type, inserted under the hooks 151A, 151B makes it possible to move the hooks away from the strap and thus to open the wall portions 115 and 115B. As indicated, the outer tabs 120 and 122 are separated from said wall portions by cutouts. As a result, the wall portions 115A and 115B being moved away does not affect the positions of the outer tabs that remain in place above the outer face of the second end of the strap. The setback formed under the heads of the outer tabs may be smaller than in the example shown in the preceding figures. Thus, once the wall portions 115A and 115B have been moved away, the second end of the strap remains under the heads of the outer tabs and tends to come to be placed against them. As a result, although the buckle is loosened, it is temporarily held on the strap. This prevents the buckle from being separated from the strap and from falling to the floor or to the ground once it has been demounted. For separating it from the strap positively, it suffices to slide the second end of the strap, thereby opening the collar, while keeping hold of the buckle.

It should be observed that the hooks 151A and 151B project radially to a greater extent than the outer tabs 120 and 122 do, and that the spacing between them is small, relative to the spacing between the outer tabs. These differences procure an indexing effect, avoiding seeking to use the hooks to position the collar relative to the tightening tool, and avoiding seeking to demount the buckle by acting on the outer tabs.

The invention claimed is:

1. A clamping collar comprising a looped metal strap and a transverse buckle retained at a first end of the strap and forming, on the outer side of said first end, a passage through which a second end of the strap can be inserted over the first end, the second end of the strap as inserted in this way being suitable for being indented so as to co-operate with at least one of the elements comprising the transverse buckle and the first end of the strap, in order to be retained so that said second end of the strap is prevented from moving in the direction in which the diameter of the collar increases, the transverse buckle comprising:

a first radially projecting outer tab, said first radially projecting outer tab having the shape of a hook having a stem carrying a head under which a recess is formed, said first radially projecting outer tab having an inner rib at a junction between the stem and the head thereof, a second radially projecting outer tab, wherein said first and second tabs extend from respective ones of the two longitudinal sides of the transverse buckle, it being possible for the second end of the strap to be inserted between said tabs, wherein said inner rib, in the vicinity of said head, presents a width so that said radially projecting outer tabs define between them, in the vicinity of said head, a width less than the width of the second end of the strap, wherein the second radially projecting outer tab has the shape of a hook having a stem carrying a head under which a recess is formed, analogous to the shape of a hook of the first radially projecting outer tab, it being possible for the second end of the strap to be inserted between the stems of said first and second radially projecting outer tabs, wherein the second radially projecting outer tab has an inner rib at a junction between the stem and the head thereof.

2. The collar as claimed in claim 1, wherein the head of the hook has a free edge that extends substantially along the length of the strap.

3. The collar as claimed in claim 1, wherein the passage includes a restraint segment defined by at least one outer wall portion of the transverse buckle situated above the outer face of the first end of the strap, and the first radially projecting outer tab is offset longitudinally relative to said outer wall portion.

4. The collar as claimed in claim 3, wherein the first radially projecting outer tab is separated from the outer wall portion by a cutout.

5. The collar as claimed in claim 4, wherein the outer wall portion and the first radially projecting outer tab extend from a longitudinal edge of the transverse buckle and have the same length as measured from that edge, in the transverse direction, the first radially projecting outer tab having a longitudinal fold line that separates the stem and the head of the hook.

6. The collar as claimed in claim 3, wherein the outer wall portion has a free longitudinal edge situated on the outer side of the first end of the strap.

7. The collar as claimed in claim 6, wherein the free longitudinal edge of the at least one external wall portion carries a hook.

8. The collar as claimed in claim 1, wherein the first radially projecting outer tab is situated in the vicinity of a transverse edge of the transverse buckle that faces away from a blocking transverse edge of the buckle.

9. The collar as claimed in claim 1, wherein the second end of the strap is configured to be inserted between the stems of the first and second radially projecting outer tabs only in the vicinity of a junction between said stems and the longitudinal sides of the transverse buckle.

10. The collar as claimed in claim 1, wherein the transverse buckle is, at least on the outer portion thereof, symmetrical about a midplane of the strap that is perpendicular to the axis of the collar.

11. The collar as claimed in claim 1, wherein the transverse buckle has an inner portion that is disposed against the inner face of the first end of the strap and that has a blocking transverse edge that faces in the opposite direction from the direction in which the free tip of the first end of the strap faces, and that co-operates with a blocking transverse stop of the first end of the strap that defines a blocking setback formed in said first end, and, in the indented state wherein said second end of the strap is retained so as to be prevented from moving in the direction in which the diameter of the collar increases, said second end of the strap has a retaining transverse stop received in the blocking setback and co-operating in abutment with a retaining edge of said blocking setback.

12. The collar as claimed in claim 11, wherein the blocking transverse edge is a free edge situated on a first free end of the inner portion of the transverse buckle.

13. The collar as claimed in claim 12, wherein the blocking transverse edge is formed at a back of a notch in the first free end of the inner portion of the transverse buckle.

14. The collar as claimed in claim 11, wherein the indenting of the second end of the strap forms a retaining setback that is defined by a transverse cutout, the retaining stop being formed on the lip of said cutout that is situated at the back of the retaining setback.

15. The collar as claimed in claim 11, wherein the inner portion of the transverse buckle has an additional blocking transverse edge that faces towards the free tip of the first end of the strap and that co-operates with an additional blocking transverse stop of the first end of the strap that defines an additional blocking setback formed in said first end.

16. The collar as claimed in claim 1, wherein the inner rib of the second radially projecting outer tab increases in thickness towards the head of the second radially projecting outer tab, and wherein the second end of the strap is configured to be inserted between the stems of the first and second radially projecting outer tabs only in the vicinity of the junctions between the stems of said radially projecting outer tabs and their respective longitudinal sides of the transverse buckle.

17. A tightening tool for tightening the collar of the type comprising a looped metal strap and a transverse buckle retained at a first end of the strap and forming, on the outer side of said first end, a passage through which a second end of the strap can be inserted over the first end, the second end of the strap as inserted in this way being suitable for being indented so as to co-operate with at least one of the elements comprising the transverse buckle and the first end of the strap, in order be retained so that said second end of the strap is prevented from moving in the direction in which the diameter of the collar increases, the transverse buckle carrying at least one radially projecting outer tab, said radially projecting outer tab having the shape of a hook having a stem carrying a head under which a recess is formed, said tightening tool comprising a head suitable for being positioned on the transverse buckle of the collar, and a punch suitable for being moved to indent the second end of the strap, wherein the head has at least one housing for receiving at least a portion of said at least one radially projecting outer tab carried by the transverse buckle of the collar, in order to position the tool relative to the collar.

18. The tightening tool as claimed in claim 17, wherein the housing comprises a hook-shaped slot.

* * * * *